(12) United States Patent
Cannon et al.

(10) Patent No.: US 8,131,669 B2
(45) Date of Patent: *Mar. 6, 2012

(54) MANAGEMENT OF REDUNDANT OBJECTS IN STORAGE SYSTEMS

(75) Inventors: David Maxwell Cannon, Tucson, AZ (US); Colin Scott Dawson, Tucson, AZ (US); Robert Clair Edwards, Jr., Susquehanna, PA (US); Michael Allen Kaczmarski, Tucson, AZ (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/005,438

(22) Filed: Jan. 12, 2011

(65) Prior Publication Data
US 2011/0113015 A1 May 12, 2011

Related U.S. Application Data

(63) Continuation of application No. 12/780,777, filed on May 14, 2010, now Pat. No. 7,895,165, which is a continuation of application No. 11/206,465, filed on Aug. 17, 2005, now Pat. No. 7,747,577.

(51) Int. Cl.
*G06F 17/00* (2006.01)
(52) U.S. Cl. ........ 707/609; 707/621; 707/640; 707/802; 707/803
(58) Field of Classification Search .......... 707/609, 707/621, 640, 802, 803
See application file for complete search history.

(56) References Cited

U.S. PATENT DOCUMENTS

| | | | |
|---|---|---|---|
| 5,627,990 A | 5/1997 | Cord et al. | |
| 5,644,766 A | 7/1997 | Coy et al. | |
| 5,649,196 A | 7/1997 | Woodhill et al. | |
| 5,729,743 A | 3/1998 | Squibb | |
| 5,732,265 A | 3/1998 | Dewitt et al. | |
| 5,778,395 A | 7/1998 | Whiting et al. | |
| 5,940,594 A * | 8/1999 | Ali et al. | 709/203 |
| 6,260,069 B1 | 7/2001 | Anglin | |
| 6,543,004 B1 * | 4/2003 | Cagle et al. | 714/15 |

(Continued)

FOREIGN PATENT DOCUMENTS
WO 0195140 12/2001

OTHER PUBLICATIONS

Jones et al., "Checking Scheme for Compares in Queuing System", IBM Corporation, Technical Disclosure Bulletin, vol. 19, No. 2, Jul. 1976, pp. 591-593.

*Primary Examiner* — Shahid Alam
*Assistant Examiner* — Andalib Lodhi
(74) *Attorney, Agent, or Firm* — Rabindranath Dutta; Konrad, Raynes and Victor LLP

(57) ABSTRACT

Provided are a method, system, and article of manufacture wherein one client node is selected from a plurality of client nodes. A determination is made that an object corresponding to a client node has to be stored. A determination is made as to whether the object has already been stored in the server node by the one selected client node. The object is stored at the server node, in response to determining that the object has not already been stored in the server node by the one selected client node.

20 Claims, 8 Drawing Sheets

U.S. PATENT DOCUMENTS

| | | | |
|---|---|---|---|
| 6,564,215 B1 * | 5/2003 | Hsiao et al. | 1/1 |
| 6,584,497 B1 | 6/2003 | Case et al. | |
| 6,615,225 B1 | 9/2003 | Cannon et al. | |
| 6,785,786 B1 * | 8/2004 | Gold et al. | 711/162 |
| 6,820,122 B1 * | 11/2004 | Mandler et al. | 709/226 |
| 6,829,637 B2 | 12/2004 | Kokku et al. | |
| 6,842,841 B1 * | 1/2005 | Kuik et al. | 711/203 |
| 6,857,053 B2 | 2/2005 | Bolik et al. | |
| 7,136,801 B2 * | 11/2006 | Leonhardt et al. | 703/27 |
| 7,403,949 B2 | 7/2008 | Cannon et al. | |
| 7,610,291 B2 | 10/2009 | Cannon et al. | |
| 7,636,824 B1 * | 12/2009 | Tormasov | 711/162 |
| 7,673,000 B2 * | 3/2010 | Smoot et al. | 709/206 |
| 2002/0065892 A1 * | 5/2002 | Malik | 709/206 |
| 2003/0105716 A1 | 6/2003 | Sutton, Jr. et al. | |
| 2003/0217068 A1 * | 11/2003 | Fruchtman et al. | 707/101 |
| 2004/0088382 A1 | 5/2004 | Therrien et al. | |
| 2004/0199521 A1 | 10/2004 | Anglin et al. | |
| 2004/0227962 A1 | 11/2004 | Xia | |
| 2005/0138195 A1 | 6/2005 | Bono | |
| 2006/0015696 A1 | 1/2006 | Nguyen et al. | |
| 2007/0283017 A1 * | 12/2007 | Anand et al. | 709/226 |
| 2008/0133827 A1 | 6/2008 | Topham et al. | |

* cited by examiner

MANAGEMENT OF REDUNDANT OBJECTS IN STORAGE SYSTEMS

CROSS-REFERENCE TO RELATED APPLICATIONS

This application is a continuation of application Ser. No. 12/780,777 filed on May 14, 2010, which is incorporated herein by reference in its entirety. application Ser. No. 12/780,777 is a continuation of application Ser. No. 11/206,465 filed on Aug. 17, 2005, which is incorporated herein by reference in its entirety.

BACKGROUND

1. Field

The disclosure relates to a method, system, and article of manufacture for the management of redundant objects in storage systems.

2. Background

A storage management application, such as IBM* Tivoli* Storage Manager* (TSM), may be implemented on a storage management server. The storage management application may manage storage requirements for a plurality of client nodes that are coupled to the storage management server via a network.

The storage management application may create and manage a repository for data and programs that are backed up, archived, migrated, or otherwise copied from the client nodes to the storage management server. The storage management server may store data objects, such as files, in one or more storage pools and may use a database stored in the storage management server for tracking information about the stored data objects.

The storage management application may perform incremental backup, incremental archiving, migration, or incremental copying of data from the client nodes to the storage management server. For example, if the storage management application comprises a backup application then the backup application may perform incremental backup operations in which files are backed up only if the files have changed since a previous, periodic full backup, where the periodic full backups may be made on a weekly, monthly or some other periodic basis. TSM extends incremental backup by using a "progressive incremental backup" in which objects are backed up once and then never backed up again unless the objects undergo modifications on a client node. The progressive incremental approach for backups, archiving, or copying of data, etc., may reduce the amount of data that has to be copied or moved to the storage management server from the client nodes, and can reduce network traffic and storage space requirements over the incremental approach for backups, archiving, or copying of data. The progressive incremental backup approach may use a database that tracks information about every stored object and the location at which each object is stored.

In certain computing environments, different client nodes may store the same files in the storage management server. For example, client nodes may have the same operating system files or different people working on the same project may store the same document locally on different client nodes. The storage of the same data object in different client nodes may introduce redundancy for backup operations because the same files may be backed up and stored on the storage management server from different client nodes, and may lead to inefficiencies even in systems using the progressive incremental approach. While the following description describes embodiments with reference to a backup of data, it is understood that alternative embodiments may be utilized for archiving of data, migration of data, etc.

SUMMARY OF THE DESCRIBED EMBODIMENTS

Provided are a method, system, and article of manufacture wherein one client node is selected from a plurality of client nodes. A determination is made that an object corresponding to a client node has to be stored. A determination is made as to whether the object has already been stored in the server node by the one selected client node. The object is stored at the server node, in response to determining that the object has not already been stored in the server node by the one selected client node.

In certain additional embodiments, the one selected client node is a first computational device, wherein the server node is a second computational device, wherein the selected client node that is the first computational device is more likely to have backed up objects in comparison to other client nodes in the plurality of client nodes, wherein the backed up objects can be used by the other clients nodes.

In further embodiments, database entries are stored corresponding to objects of the plurality of client nodes in the server node, wherein the database entries include metadata corresponding to the objects. Included in the database entries are references directed at those objects that are stored in the server node by the one selected client node.

In still further embodiments, determining whether the object has already been stored in the server node by the one selected client node further comprises computing a checksum for the object that is requested to be stored by the client node, in response to determining from the database entries that the one selected client node has stored at least one object with the same metadata as the object that is requested to be stored by the client node. A determination is made that the object has already been stored in the server node if the computed checksum for the object is the same as a previously computed checksum for the at least one object stored by the one selected client.

In yet additional embodiments, the time complexity for determining for the plurality of client nodes whether objects included in the plurality of client nodes have already been stored in the server node by the one selected client node is linear with respect to the number of the plurality of client nodes.

In further embodiments, the server node stores data backed up by the one selected client node in a first storage medium that is accessible faster in comparison to a second storage medium in which data backed up by client nodes that are different from the one selected client node are stored.

In still further embodiments, the server node and the one selected client node are implemented in a single computational device, wherein the server and the plurality of client nodes can communicate in a client server environment and in a peer to peer environment.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made. For example, while the following description describes embodiments with reference to a backup of data, it is understood that alternative embodiments may be utilized for archiving of data, migration of data, etc.

Redundant Objects in Storage Management Systems

Certain storage management applications reduce redundancy by recognizing objects that have previously been backed up by other client nodes and by not backing up multiple instances of the same object from a plurality of client nodes. While such an approach may reduce redundancy, extensive processing may be required to determine whether a particular object has already been backed up by any other client node. If there are n client nodes, then the time complexity of methods that implement such approaches may be $O(n^2)$. As a result, such approaches may not scale well. For example, if the number of client nodes are doubled, then the time required may be quadrupled, and if the number of client nodes are tripled, then the time required may increase by a factor of nine.

Additionally, if objects are stored on removable media, such as, tapes, either initially or subsequent to the backup, restore times can become significant because a restore may need mounting and positioning of many tapes to access redundant objects that were backed up by different client nodes at different times.

Furthermore, it may be not be possible to query object attributes that are relevant to a specific client node if the object was backed up by another client node. For example, two client nodes may have the same redundant object for a finite period of time, but the object could be modified at different times or managed by different policies on different client nodes.

Certain embodiments address some or all of the above deficiencies of certain storage management systems.

Reduction of Redundant Objects

Figure 1:
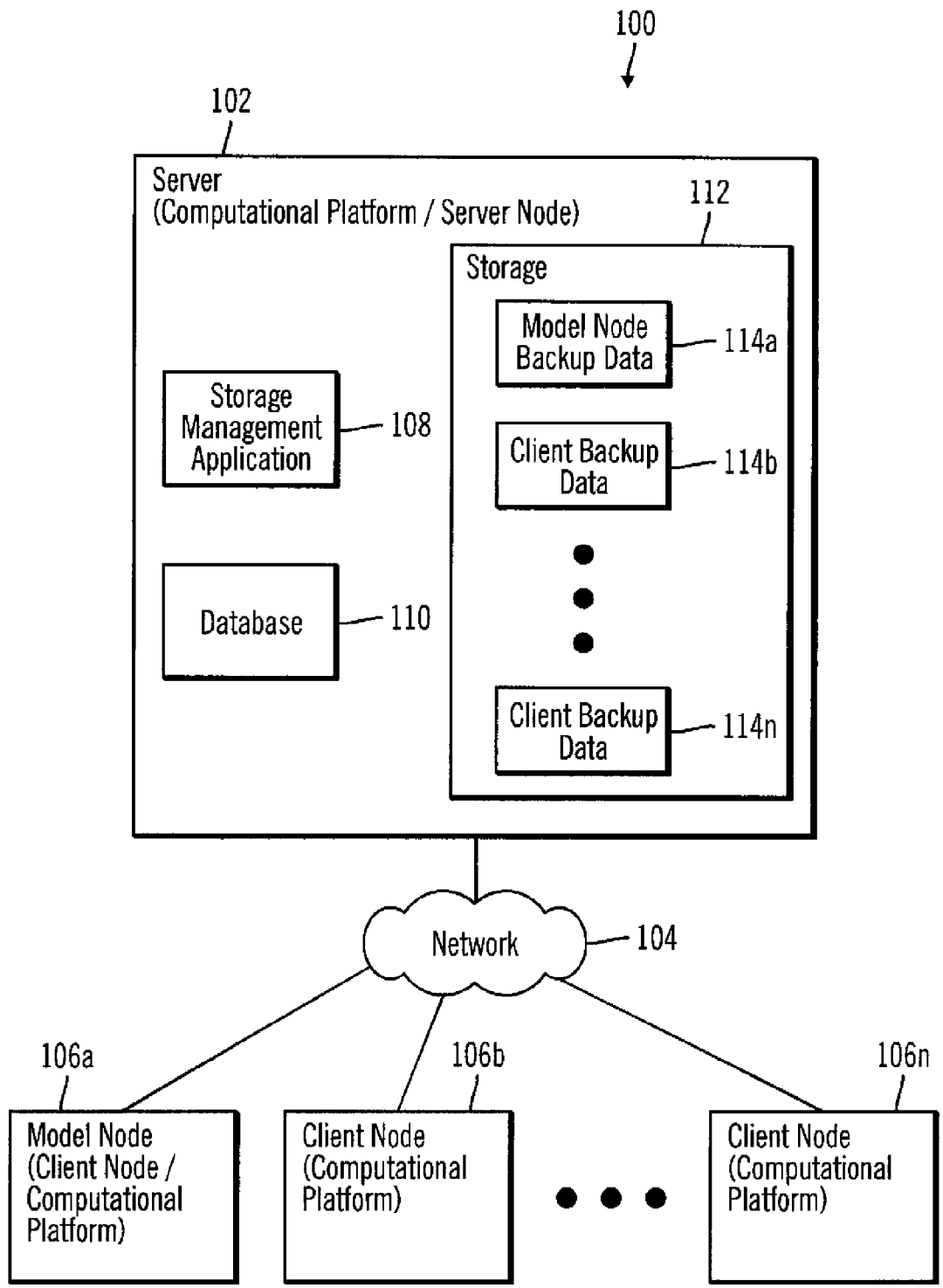
FIG. 1 illustrates a block diagram of a computing environment in accordance with certain embodiments.

FIG. 1 illustrates a block diagram of a computing environment 100 in accordance with certain embodiments. At least one computational platform 102, where in certain embodiments the computational platform 102 may comprise a server, is coupled via a network 104 to a plurality of computational platforms 106a, 106b, . . . ,106n, where in certain embodiments the plurality of computational platforms 106a . . . 106n may comprise client nodes. While FIG. 1 indicates the computational platform 102 to be a server, and the computational platforms 106a . . . 106n to be client nodes, in alternative embodiments the computational platforms 102, 106a . . . 106n may comprise any suitable computational platform, including those presently known in the art, such as, personal computers, workstations, mainframes, midrange computers, network appliances, palm top computers, telephony devices, blade computers, hand held computers, etc. The server 102 may also be referred to as a server node and the client nodes 106a . . . 106n may also be referred to as clients. Alternative embodiments may be implemented in a computing environment that is not based on a client-server paradigm. For example alternative embodiments may be implemented in a peer-to-peer networked environment.

In certain embodiments, a selected client node, such as client node 106a, is designated as a model node 106a. While FIG. 1 shows client node 106a being designated as the model node, in alternative embodiments a different client node, such as client node 106b, may be designated as the model node.

The model node 106a may be selected via a computer program or may be designated by a user. The model node 106a may be selected according to a criterion such that objects to be backed up from client nodes 106b . . . 106b to the server 102 are more likely to have been backed up from the model node 106a than from any other client node.

The coupling of the server 102 to the client nodes 106a . . . 106n may be direct or may be via any network 104 known in the art, such as a Storage Area Network (SAN), Local Area Network (LAN), Wide Area Network (WAN), the Internet, an Intranet, etc.

A storage management application 108, a database 110, and a storage 112 may be coupled to the server 102. While FIG. 1 shows the storage 112 to be inside the server, in certain embodiments, the storage 112 may be external to the server 102 and may comprise storage units that are coupled to the server via a network. For the purposes of the application, the server 102, also referred to as a server node 102, may be considered to encompass the storage 112 whether or not the storage 112 is internal or external to the server 102. In certain embodiments, the server 102 may be used for backup processing. In other embodiments, the server 102 may be used for archiving, migration or copying of data.

The storage management application 108 may allow objects from the model node 106a to be backed up to the storage 112 and stored as the model node backup data 114a. Similarly, the storage management application 108 may also allow objects from the client nodes 106b . . . 106n to be backed up to the storage 112 and stored as the client node backup data 114b . . . 114n. For example, objects from client node 106b may be backed up in the storage 112 as the client backup data 114b.

The database 110 includes an inventory with entries for each backup object of the model node 106a, and the client nodes 106b . . . 106n. The storage management application 108 may query the database 110 for inventory information corresponding to one or more objects of any client node 106b . . . 106n, even when some of the queried objects may have been stored from the model node 106a.

Therefore, FIG. 1 illustrates certain embodiments in which the storage management application 108 allows the model node 106a to backup objects in the storage 112. In response to a request from a client node, such as client node 106b, to backup an object to the storage 112, the storage management application 108 determines whether the object has already been backed up by the model node 106a. If the object has not been already backed up by the model node 106a, the client node sends the data corresponding to the object to the storage 112. If the object has already been backed up by the model node 106a, a reference to the preexisting object backed up the model node 106a is generated to provide the backup data of the client node.

Figure 2:
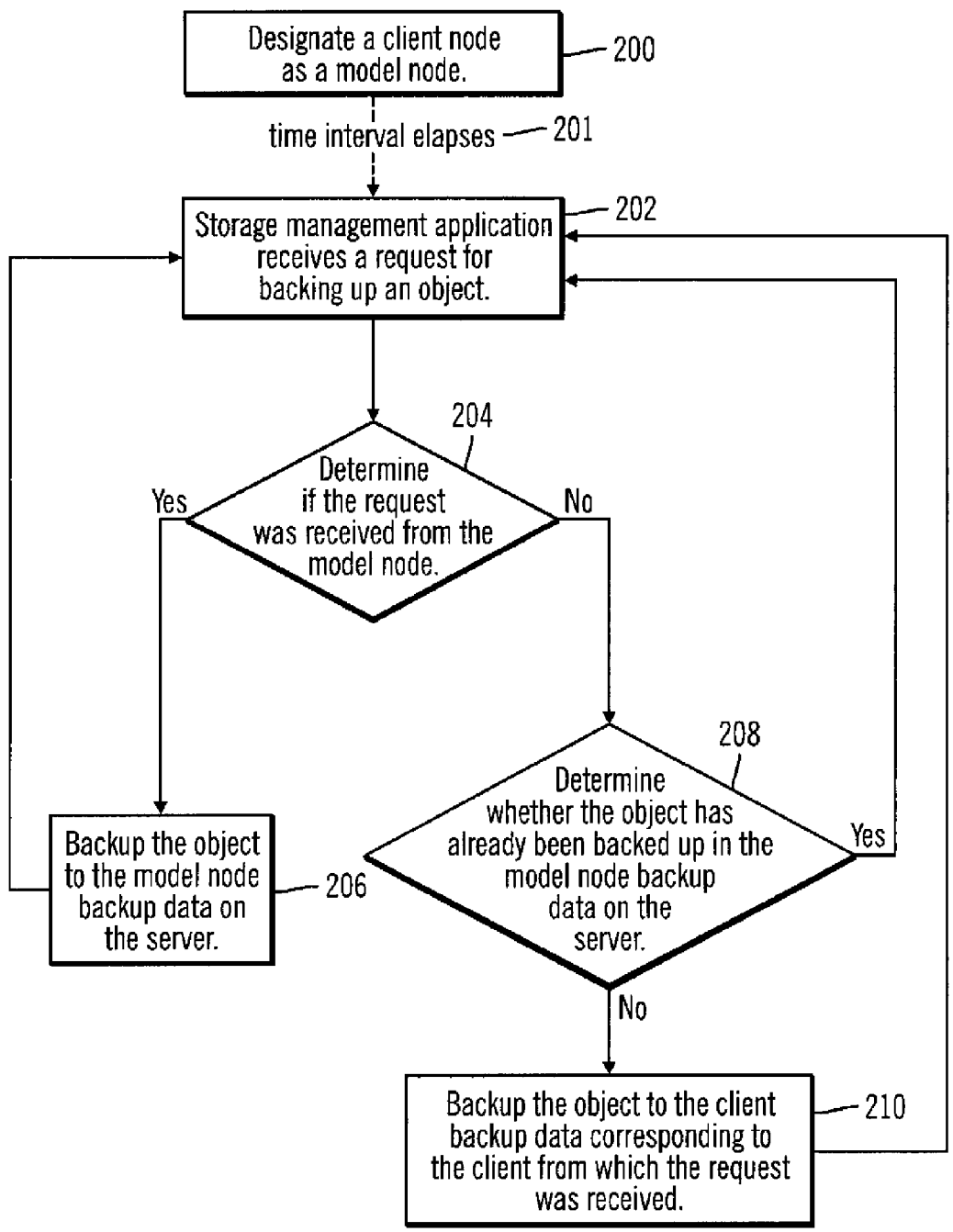
FIG. 2 illustrates a first flowchart that shows how objects are backed up from a plurality of client nodes to a server node, in accordance with certain embodiments.

FIG. 2 illustrates a first flowchart that shows how objects are backed up from a plurality of client nodes 106a . . . 106n to a server node 102, in accordance with certain embodiments.

Control starts at block 200, where a client node, such as client node 106a, is designated as a model node 106a. As discussed earlier, the model node 106a may be selected according to a criterion such that objects to be backed up from client nodes 106b . . . 106n to the server 102 are more likely to have been backed up from the model node 106a than from any other client node. However, a variety of different methodologies may be used to designate a client node as the model node 106a. In alternative embodiments, instead of designating a single client node as the model node 106a, a fixed number of client nodes may be designated as model nodes. For example, in certain embodiments two clients nodes 106a, 106b may be designated as model nodes 106a, 106b. In such a case, the model nodes 106a, 106b may be selected according to a criterion such that objects to be backed up from client nodes to the server 102 are more likely to have been backed up from the model nodes 106a, 106b than from any other client node.

In certain embodiments, the model node 106a may have commonly used applications and data that may be present in the plurality of client nodes 106b . . . 106n. For example, the model node 106a may be used by a system administrator who updates the model node 106a with the latest updates to the operating system and software applications as such updates are released. The objects of the model node 106a may be backed up in the server 102. In certain embodiments, if an object has already been backed up by the model node 106a, then a particular client node, such as any of the client nodes 106b . . . 106n, may backup objects to the server 102 by updating the database 110 to show that the object has been backed up for the particular client node even though the particular client node did not actually need to send the data to the server. For example, even if an object has already been backed up by the model node 106a, the object can be backed up for another node by creating a metadata reference to the object previously stored by the model node 106a.

From block 200, after a certain time interval elapses (block 201) control proceeds to block 202 where the storage management application 108 receives a request for backing up an object. The object may include a file or any other data. Additionally, block 202 need not be executed immediately on the execution of block 200. For example, the model node 106a may be selected well in advance of the receipt of the request for backing up an object. The lapse of time between the execution of block 200 and block 202 is indicated by a dashed line in FIG. 2.

The storage management application 108 determines (at block 204) whether the request was received from the model node 106a. If so, the storage management application 108 allows (at block 206) the object to be backed up to the model node backup data 114a in the storage 112 that is coupled to the server 102 and control returns to block 202 where the storage management application 108 receives the next request for backing up an object.

If at block 204, the storage management application 108 determines that the request was not received from the model node 106, then it can be concluded that the request for backing up the object was received from a client node 106b . . . 106n. The storage management application 108 determines (at block 208) whether the object has already been backed up in the model node backup data 114a on the server 102. If so, there is no need to send the object to the server 102 as the object has already been backed up in the server 102 by the model node 106a. Instead, the object can be backed up by creating a metadata reference to the object previously stored in the server 102 by the model node 106a. Control returns to block 202 where the storage management application 108 receives the next request for backing up an object.

If at block 208 the storage management application 108 determines that the object has not been backed up in the model node backup data 114a on the server 102, then the storage management application 108 backs up (at block 210) the object to the storage 112 in the client backup data corresponding to the client whose object is being backed up. Control returns to block 202 where the storage management application 108 receives the next request for backing up an object.

Therefore, FIG. 2 illustrates certain embodiments in which while backing up objects from a client node, the storage management application 108 checks for redundant objects that are found on the model node 106a but does not check for redundant objects that are found in client nodes different from the model node 106a. As a result the check for redundant objects for all client nodes can be performed within a time complexity of O(n), where n is the number of client nodes, which is more efficient in terms of time than algorithms that implement such approaches with a time complexity of $O(n^2)$. Note that for a single client node, the checking for redundant objects can be performed in constant time in certain embodiments illustrated in FIG. 2.

By avoiding checking for redundant objects in nodes other than the model node 106a, it is possible that certain objects may be stored redundantly in the server 102 by multiple client nodes. However the advantage of reducing the time complexity to O(n) is significant enough, such that, a certain limited number of redundant objects may be tolerable in the server 102.

FIG. 3a, 3b illustrate block diagrams that show exemplary storage media in which objects may be backed up in the server node 102, in accordance with certain embodiments.

In FIG. 3a, exemplary storage 300 coupled to the server 102 may include a disk 302a or some other direct access storage device 302a, where the disk 302a stores the model node backup data 114a. The removable media 302b . . . 302n, such as tapes, coupled to the server 102 store the client backup data 114b . . . 114n. If the computing environment 100 includes the exemplary storage 300, then while restoring data for a particular client node from a tape, it is necessary to mount and position only the tapes used for the particular client node because the data of the model node 106a is already stored in the disk 302a. Since only the tapes used for the particular client node are mounted and positioned, the restoration of data may be faster in comparison to various other approaches.

In FIG. 3b, exemplary storage 304 coupled to the server 102 may include a plurality of removable media 306a . . . 306n, such as tapes. Tape 306a stores the model node backup data 114a, and tapes 306b . . . 306n store the client backup data 114b . . . 114n respectively. If the computing environment 100 includes the exemplary storage 304, then while restoring data for a particular client node from a tape, it is necessary to mount and position only the tape 306a used for the model node backup data 114a, and the tape used for the particular client node. Since only tape 306a is used for the model node backup data 114a, in addition to tape 306a the tape used for the particular client node is mounted and positioned and the restoration of data may be faster in comparison to various other approaches.

Figure 3:
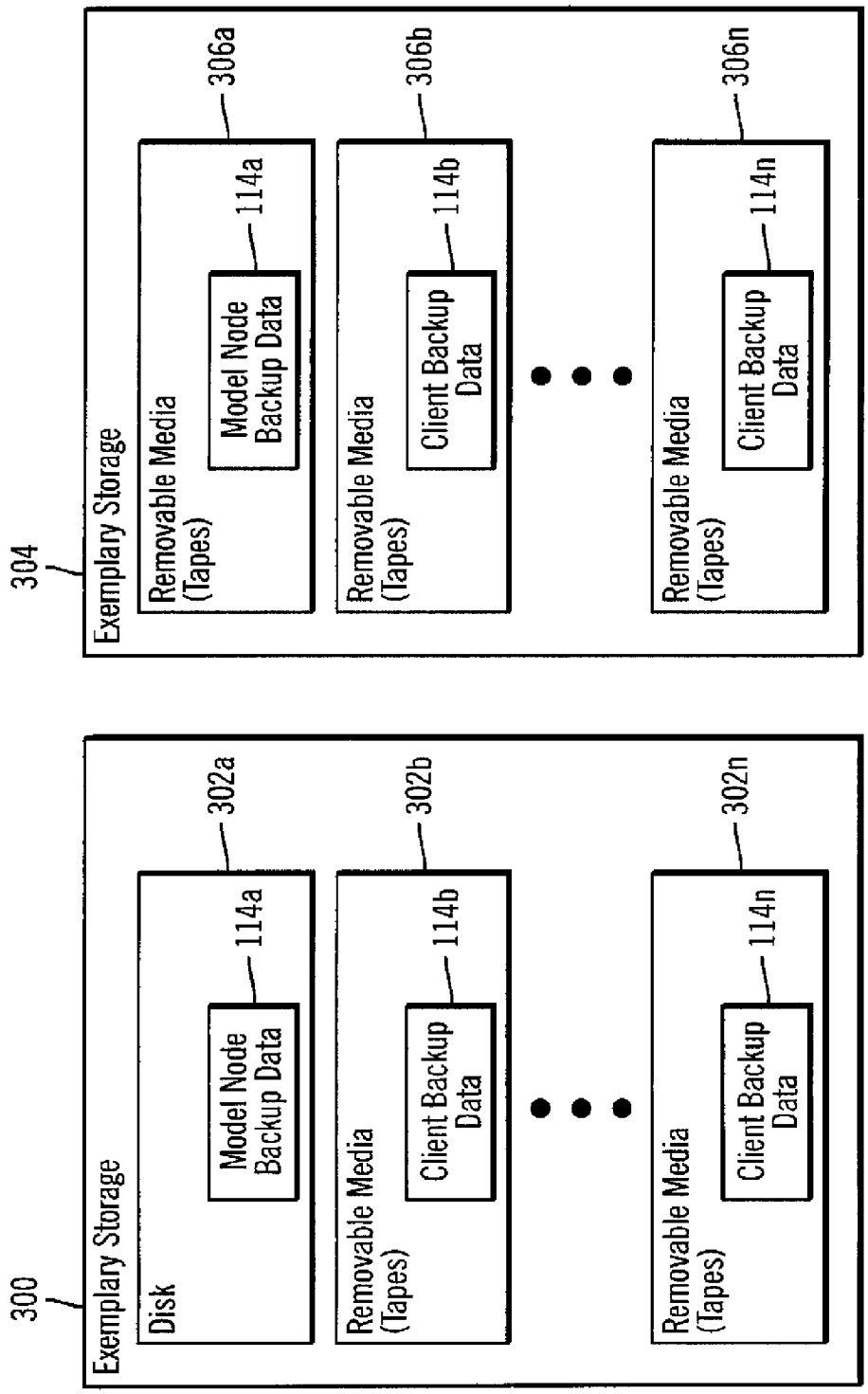
FIG. 3a, 3b illustrate block diagrams that show exemplary storage media in which objects may be backed up in the server node, in accordance with certain embodiments.

Therefore, FIG. 3 illustrates certain embodiments in which the backup data for the model node is stored in one storage medium, and the backup data for each specific client node is stored in a corresponding specific storage media, i.e., for every client node there is a specific storage medium to store the backup data of the client node. Thus, the backup data corresponding to different client nodes are stored in different storage media. Since all the data for a particular client node is located in a storage medium, such as, a tape, only the storage medium corresponding to the particular client node and if necessary the storage medium corresponding to the model node may have to be mounted and positioned for restoring data for the particular client node. In embodiments where the data for the model node is stored in a disk, no positioning of tapes are needed for the backup data corresponding to the model node. In certain alternative embodiments in which data for the model node and the client nodes are stored on disk, no positioning of tapes is necessary for restoring data. Additionally in certain embodiments, client backup for a plurality of nodes 114a . . . 114n could be stored on a single tape, and embodiments do not require that a volume only contain data for a single client.

Figure 4:
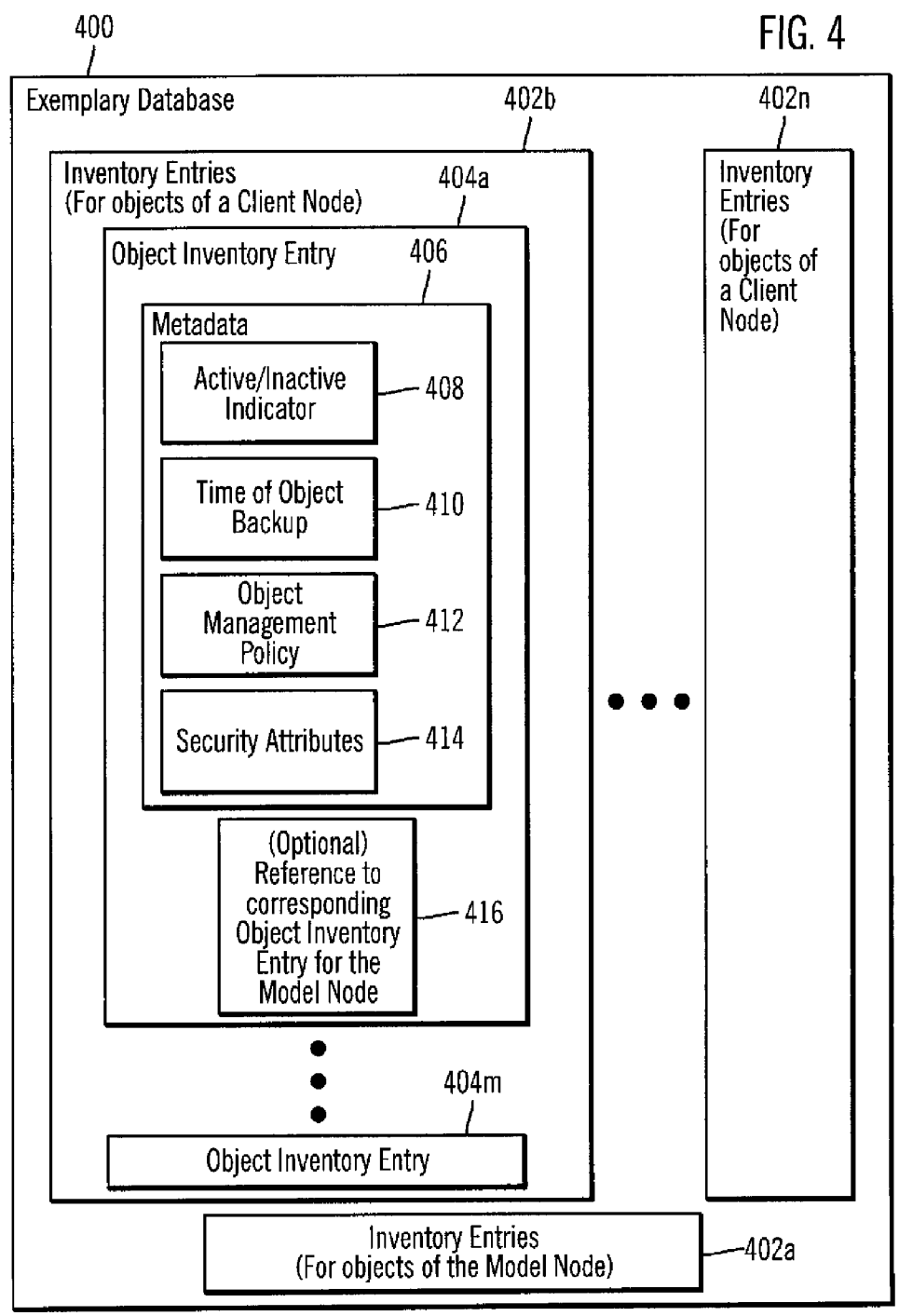
FIG. 4 illustrates an exemplary database for maintaining inventory entries for objects, in accordance with certain embodiments.

FIG. 4 illustrates an exemplary database 400 implemented in the server 102 for maintaining inventory entries for objects, in accordance with certain embodiments.

The exemplary database 400 may include inventory entries 402a for objects of the model node 106a, and inventory entries 402b . . . 402n for objects of the client nodes 106b . . . 106n. In FIG. 4, data structures of the inventory entries 402b for objects of the client node 106b are shown for illustration.

The inventory entries 402b for client node 106b include a plurality of object inventory entries 404a . . . 404m corresponding to objects of the client node 106b. An exemplary object inventory entry 404a may include metadata 406 for the corresponding object, where the metadata 406 may include an active/inactive indicator 408 that indicates whether the object is active or inactive for the client node 106b. The exemplary object inventory entry 404a may also include a time of object backup 410 that indicates when the object was backed up for the client node 106b even though the object may have previously been stored for the model node 106a. Additionally, the exemplary object inventory entry 404a may also include an object management policy 412 that indicates a policy by which the object is managed for the client node 106b, even though a different policy might be used for the same object on other client nodes. The exemplary object inventory entry 404a may also include security attributes 414 for the object of the client node 106b, where the security attributes could be different for the same object on different client nodes.

In addition to the metadata 406, the object inventory entry 404a may also include a reference to a corresponding object inventory entry for the model node 106a, if the object was actually backed up by the model node 106a. In certain embodiments, the object inventory entry of the model node 106a is not deleted as long as there are references to the object inventory entry of the model node 106a from other client nodes.

The data structures shown in the exemplary database 400 are shown for illustration. In alternative embodiments, the exemplary database 400 may be structured differently.

The exemplary database reduces redundancy of nodes by storing references 416 to corresponding object inventory entries for the model node, but at the same time allows for different attributes for the same object on different nodes by storing the attributes in the metadata 406. For example, client node 106b may have different security attributes 414 for the same object when compared to client node 106n. The exemplary database 400 can also be queried for information pertaining to objects of a particular client node, even though some of the objects may have been stored in the model node 106a.

Figure 5:
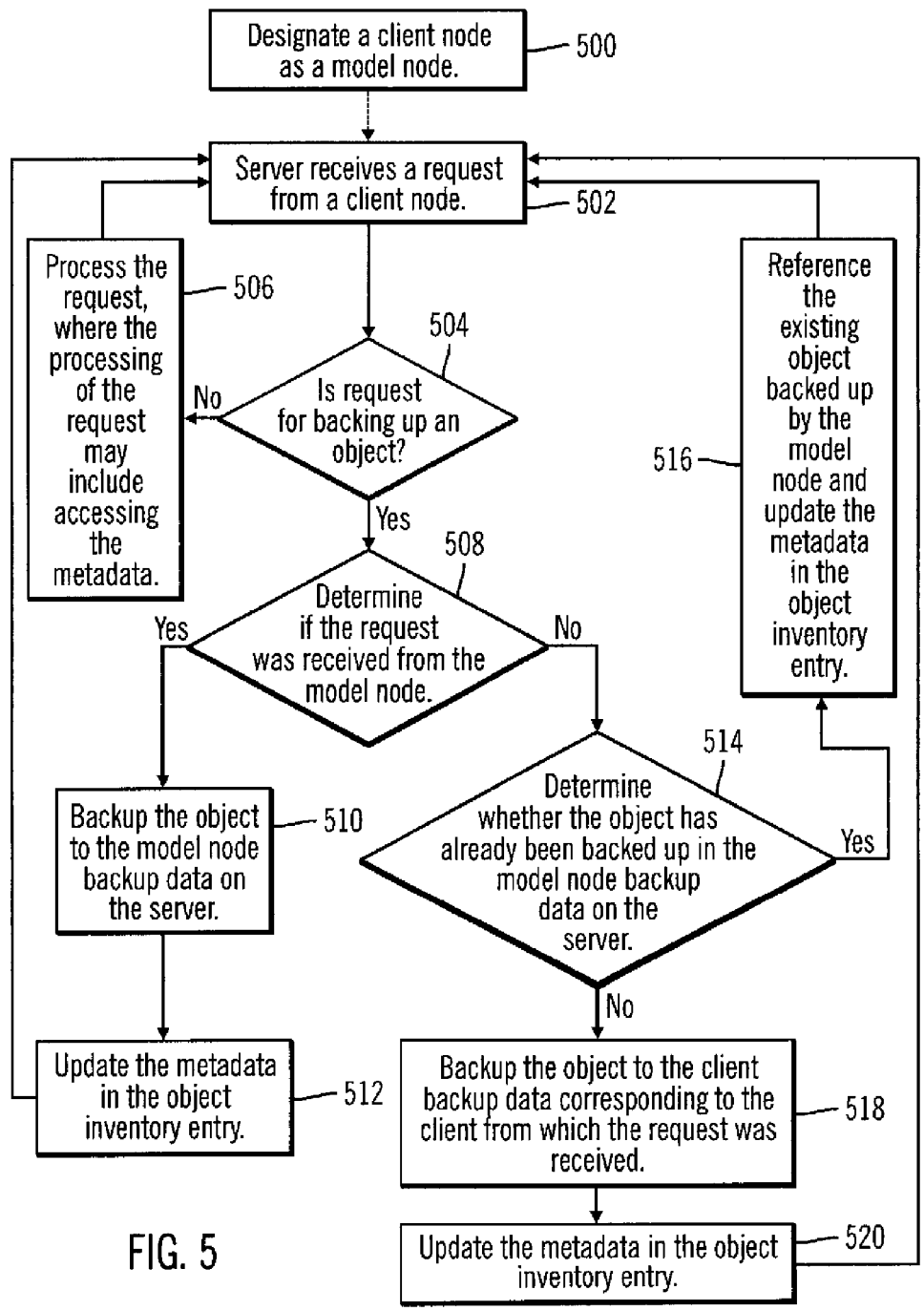
FIG. 5 illustrates a second flowchart that shows the use of the inventory entries of FIG. 4, and further shows how objects are backed up from a plurality of client nodes to a server node.

FIG. 5 illustrates a second flowchart that shows the use of the inventory entries 402b of FIG. 4, and further shows how objects are backed up from a plurality of client nodes 106a . . . 106n to a server node 102.

Control starts at block 500, where a client node, such as client node 106a, is designated as a model node 106a. From block 500, control proceeds to block 502 where the storage management application 108 on the server 102 receives a request from a client node. In certain exemplary embodiments the request is related to an object. In other exemplary embodiments, the request could be for providing a list of files matching a particular pattern. In further embodiments, the request could be for changing a password. Other types of requests may be made in additional embodiments. In certain embodiments, metadata 406 corresponding to the request received in block 502 may possibly have already been stored in the exemplary database 400 in association with a backing up of one or more objects to the server 102. A client node may use the metadata 406 to determine whether an object needs to be backed up. For example, if an object is stored on the client node, but there is no corresponding inventory entry for that object on the server 102, then the client may send a request to backup the object. A backup operation may also comprise referencing an object previously stored by the model node 106a.

The storage management application 108 determines (at block 504) whether the request is for backing up an object. If not, then the storage management application 108 processes (at block 506) the request, where the processing of the request may include accessing the metadata 406 for the object stored in the exemplary database 400. Control returns to block 502 for processing the next request.

If the storage management application 108 determines (at block 504) that the request is for backing up an object, then the storage management application 108 determines (at block 508) whether the request was received from the model node 106a. If so, the storage management application 108 allows (at block 510) the object to be backed up to the model node backup data 114a in the storage 112 that is coupled to the server 102. The storage management application 108 updates (at block 512) the metadata 406 corresponding to the object in the exemplary database 400. During the execution of block 512, the metadata includes a checksum for the object stored by the model node 106a. This checksum may be used in block 606 of FIG. 6 (to be described later) to determine whether the model node 106a has already stored an object. Control returns to block 502 where the storage management application 108 receives the next request. In certain embodiments, the storage management application 108 stores data before metadata, to ensure that the data has been successfully stored before the metadata is added to the exemplary database 400.

If at block 508, the storage management application 108 determines that the request was not received from the model node 106, then it can be concluded that the request for backing up the object was received from a client node 106b . . . 106n. The storage management application 108 determines (at block 514) whether the object has already been backed up in the model node backup data 114a on the server 102. If so, there is no need to resend the object as the object has already been backed up in the server 102 by the model node 106a. The backup may comprise referencing (at block 516) the existing object backed up by the model node 106a by creating or updating the reference to the corresponding object inventory entry for the model node 416. Additionally, after also creating or updating (at block 516) the metadata 406 corresponding to the object in the inventory entries 402b of the exemplary database 400 control returns to block 502 where the storage management application 108 receives the next request.

If at block 514 the storage management application 108 determines that the object has not been backed up in the model node backup data 114a on the server 102, then the storage management application 108 backs up (at block 518) the object to the storage 112 in the client backup data corresponding to the client whose object is being backed up. The storage management application 108 updates (at block 520) the metadata 406 corresponding to the object in the inventory entries 402, and then control returns to block 502 where the storage management application 108 receives the next request.

Therefore, FIG. 5 illustrates certain embodiments in which the metadata corresponding to the objects may be accessed or updated in the process of responding to requests from a client to the server 102. FIG. 5 also illustrates certain embodiments in which while backing up objects from a client node, the storage management application 108 checks for redundant objects that are found on the model node 106a but does not check for redundant objects that are found in client nodes different from the model node 106a.

Figure 6:
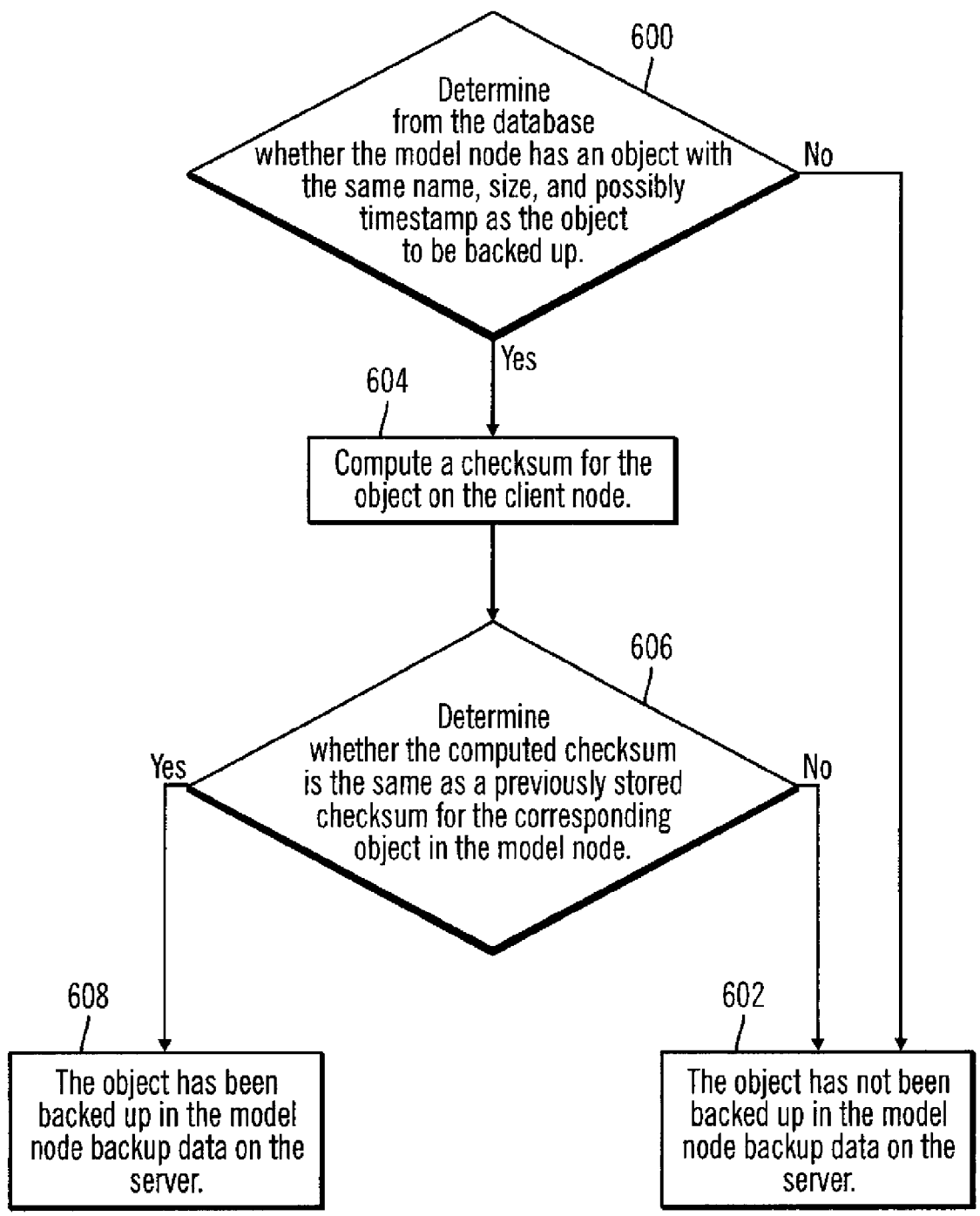
FIG. 6 illustrates a third flowchart that shows how to determine whether an object to be backed up from a client node has already been backed up by a model node, in accordance with certain embodiments.

FIG. 6 illustrates a third flowchart that shows how to determine whether an object to be backed up from a client node has already been backed up by the model node 106a, in accordance with certain embodiments. The operations described in the flowchart of FIG. 6 may be implemented by the storage management application 108 on the server 102. The operations illustrated in FIG. 6 can be used to implement the operations described in block 208 of FIG. 2 or block 514 of FIG. 5.

Control starts at block 600, where the storage management application 108 determines from the exemplary database 400 whether the model node 106a has an object with the same name, size, and timestamp as the object to be backed up from the client node. Other properties for objects besides name, size and timestamp may also be used for the comparison in block 600.

If the storage management application 108 determines (at block 600) from the exemplary database 400 that the model node 106a does not have an object with the same name, size, and timestamp as the object to be backed up from the client node, then a determination is made (at block 602) that the object has not been backed up in the model node backup data 114a on the server 102.

If the storage management application 108 determines (at block 600) from the exemplary database 400 that the model node 106a has an object with the same name, size, and timestamp as the object to be backed up from the client node, then control proceeds to block 604, where the storage management application 108 computes a checksum for the object to be backed up from the client node. Other functions, such as a hash function, may be computed for the object in alternative embodiments.

Control proceeds to block 606, where the storage management application 108 determines whether the computed checksum is the same as a previously stored checksum for the object in the model node 106a found in block 600. If so, a determination is made (at block 608) that the object has been backed up in the model node backup data 114a on the server 102. If not, a determination is made (at block 602) that the object has not been backed up in the model node backup data 114a on the server 102.

The operations described in FIG. 6 check only those objects that are candidates for being backed up. The checking for matches is performed on the objects of the appropriate model node 106a and the checksum is not computed unless the other key attributes match. Additionally, the exemplary database 400 can be used with keys to facilitate rapid checking for potential matches of objects stored in the server 102 from the model node 106a.

Figure 7:
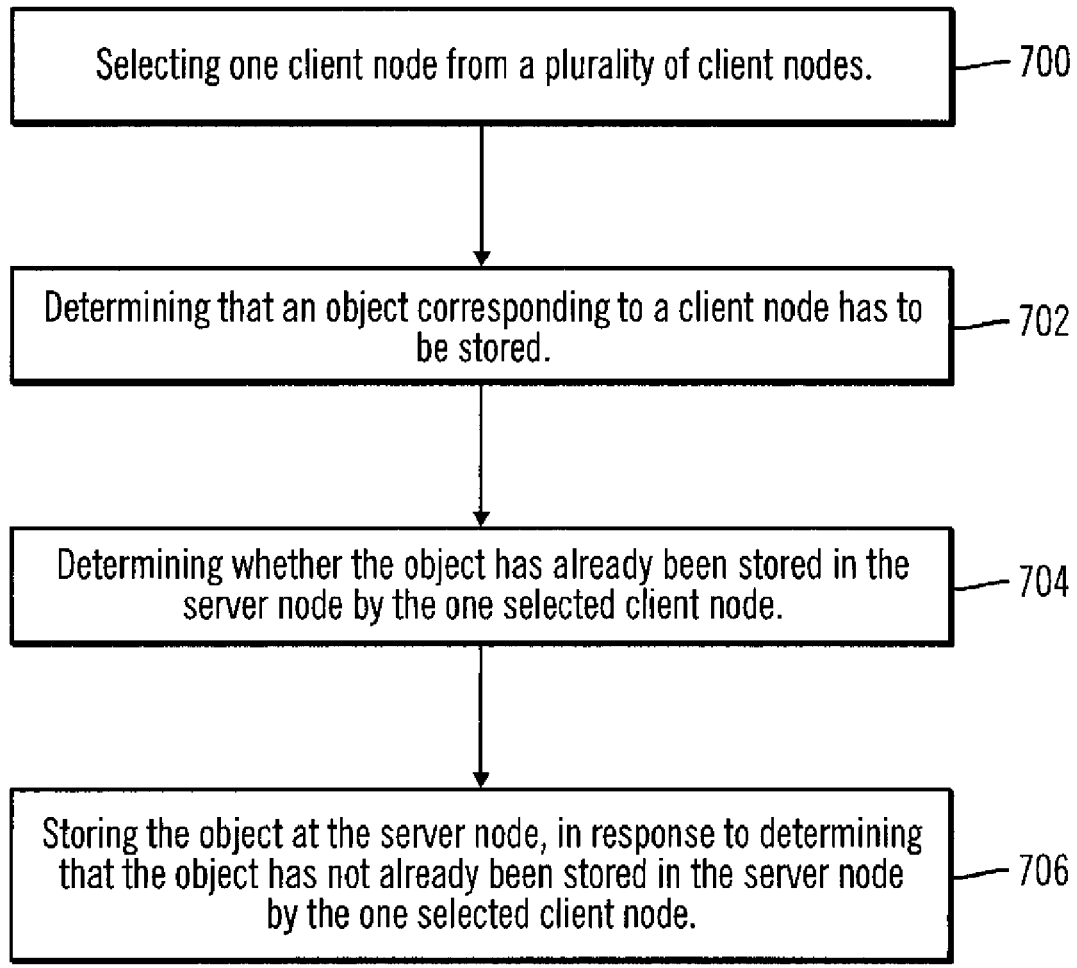
FIG. 7 illustrates a fourth flowchart that shows how an object is stored from a client node to a server node based on whether the object has already been stored in the server node by a selected client node, in accordance with certain embodiments.

FIG. 7 illustrates a fourth flowchart that shows how an object is stored from a client node to a server node 102 based on whether the object has already been stored in the server node 102 by a selected client node, in accordance with certain embodiments. In certain embodiments the operations illustrated in FIG. 7 may be implemented in the storage management application 108 on the server 102.

Control starts at block 700 where the storage management application 108 selects one client node 106a from a plurality of client nodes 106a . . . 106n. In certain embodiments the selected one client node 106a may comprise the model node 106a.

The storage management application 108 on the server node 102 determines (at block 702) that an object corresponding to a client node, such as, any of the client nodes 106b . . . 106n, has to be stored. In certain embodiments, the determination at block 702 is made in response to the storage management application 108 receiving from a client node a request for storing an object in a server node 102. In certain additional embodiments, the server node 102 may include storage 112 that is coupled to the server node 102.

The storage management application 108 determines (at block 704) whether the object has already been stored in the server node 102 by the one selected client node 106a. The storage management application 108 stores (at block 706) the object at the server node 102, in response to determining that the object has not already been stored in the server node by the one selected client node 106a.

In certain embodiments the storage management application 108 may receive a request for restoring an object. If the request for restoration of the object is from the model node 106a, then the storage management application 108 processes the metadata corresponding to the object and restores the object. However, if the request for restoration of the object is from a client node, such as, any of the client nodes 106b . . . 106n, then the storage management application 108 processes the metadata corresponding to the object and may find it necessary to restore the object by following the reference 416 to the corresponding object inventory entry for the model node.

Certain embodiments allow a check for redundant objects for all client nodes to be performed within a time complexity of O(n), where n is the number of client nodes. Inventory entries for objects stored in a database 400 allow for attribute differences for the same object on different client nodes, even though an object may be stored in the server only for the model node 106a. The time for matching redundant objects is reduced by first checking for whether two objects have the similar attributes, and then if necessary comparing the checksum of the objects to determine whether the objects match., i.e., an object is a redundant object.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
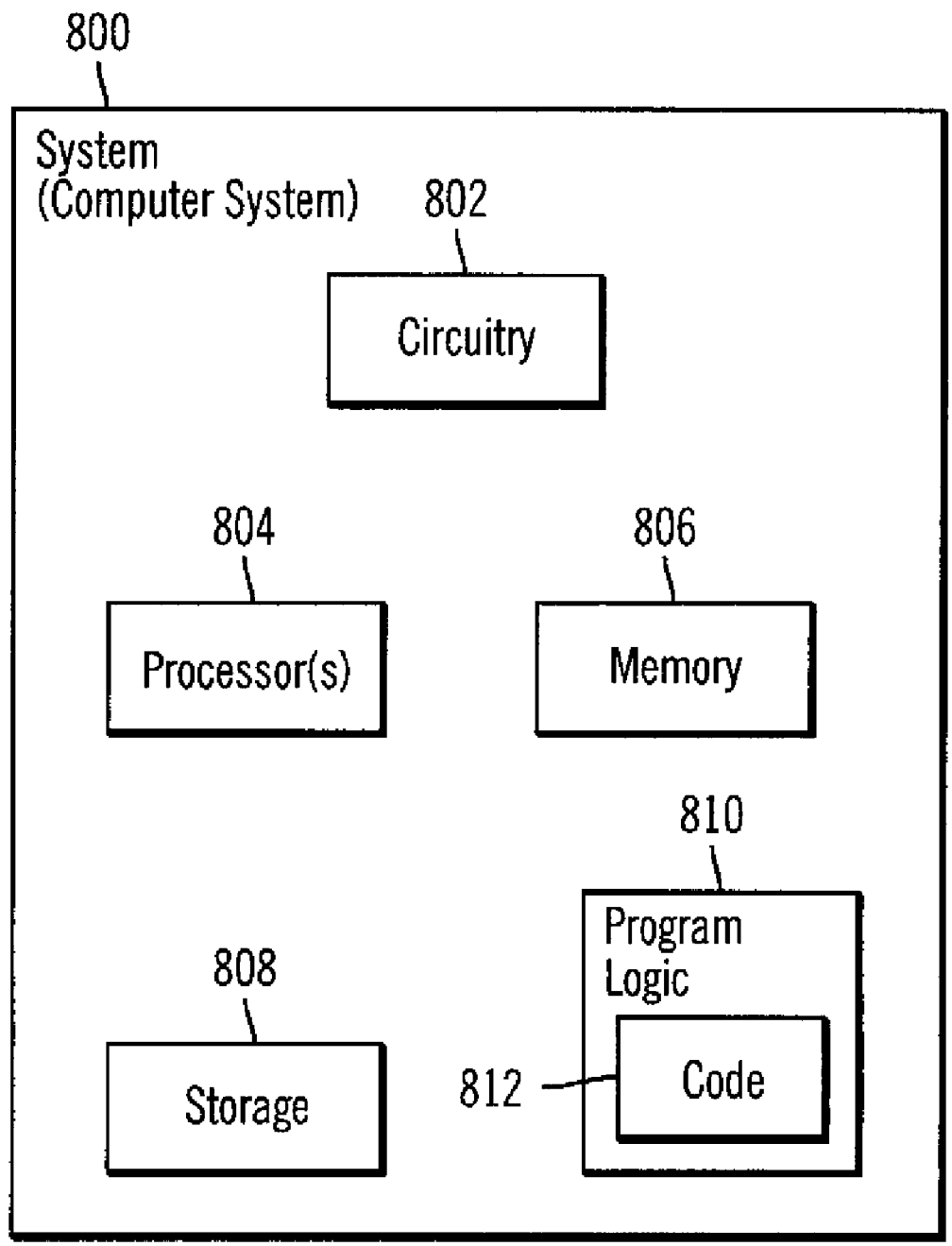
FIG. 8 illustrates the architecture of a computer system, wherein in certain embodiments the server and the clients of the computing environment of FIG. 1 may be implemented in accordance with the architecture of the computer system.

FIG. 8 illustrates an exemplary computer system 800, wherein in certain embodiments the server 102 and the client nodes 106a . . . 106n of the computing environment 100 of FIG. 1 may be implemented in accordance with the computer architecture of the computer system 800. The computer system 800 may also be referred to as a system, and may include a circuitry 802 that may in certain embodiments include a processor 804. The system 800 may also include a memory 806 (e.g., a volatile memory device), and storage 808. Certain elements of the system 800 may or may not be found in the server 102 and the client nodes 106a . . . 106n. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 2, 5, 6, and 7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   maintaining a server node in a networked computing environment, wherein the server node is coupled to a plurality of client nodes via a network, and wherein storage is coupled to the server node within the networked computing environment;
   selecting a model node that is a first client node of the plurality of client nodes, prior to receiving a request to backup an object corresponding to a second client node of the plurality of client nodes at the server node, wherein the model node is selected according to a criterion such that objects to be backed up from the plurality of client nodes to the storage coupled to the server node are more likely to have been backed up from the model node than from any other client node of the plurality of client nodes, wherein metadata corresponding to the objects is stored in a database, and wherein the model node is updated more frequently with latest updates in comparison to other client nodes of the plurality of client nodes; and
   in response to selecting the model node, storing in the storage, by the server node, data backed up by the model node in a first storage medium that is accessible faster in comparison to a second storage medium in which data backed up by client nodes that are different from the model node are stored.

2. The method of claim 1,
   wherein the first storage medium is a disk,
   wherein the second storage medium comprises a plurality of tapes,
   wherein the data backed up by the model node is stored in the disk, and
   wherein the data backed by the client nodes that are different from the model node are stored in the plurality of tapes.

3. The method of claim 2, wherein each tape of the plurality of tapes store backup data corresponding to different client nodes of the plurality of nodes.

4. The method of claim 2, wherein:
   the network comprises the Internet;
   the server node and the plurality of client nodes are configurable to communicate in a client server environment and in a peer to peer environment in the networked computing environment; and
   the server node and the plurality of client nodes comprise computational platforms.

5. The method of claim 1, further comprising:
   storing database entries corresponding to objects of the plurality of client nodes in the server node; and
   including in the database entries references directed at those objects that are stored in the server node by the model node.

6. A system, comprising:
   a memory; and
   a processor coupled to the memory, wherein the processor performs operations, the operations comprising:
   maintaining a server node in a networked computing environment, wherein the server node is coupled to a plurality of client nodes via a network, and wherein storage is coupled to the server node within the networked computing environment;
   selecting a model node that is a first client node of the plurality of client nodes, prior to receiving a request to backup an object corresponding to a second client node of the plurality of client nodes at the server node, wherein the model node is selected according to a criterion such that objects to be backed up from the plurality of client nodes to the storage coupled to the server node are more likely to have been backed up from the model node than from any other client node of the plurality of client nodes, wherein metadata corresponding to the objects is stored in a database, and wherein the model node is updated more frequently with latest updates in comparison to other client nodes of the plurality of client nodes; and
   in response to selecting the model node, storing in the storage, by the server node, data backed up by the model node in a first storage medium that is accessible faster in comparison to a second storage medium in which data backed up by client nodes that are different from the model node are stored.

7. The system of claim 6,
   wherein the first storage medium is a disk,
   wherein the second storage medium comprises a plurality of tapes,
   wherein the data backed up by the model node is stored in the disk, and
   wherein the data backed by the client nodes that are different from the model node are stored in the plurality of tapes.

8. The system of claim 7, wherein each tape of the plurality of tapes store backup data corresponding to different client nodes of the plurality of nodes.

9. The system of claim 7, wherein:
   the network comprises the Internet;
   the server node and the plurality of client nodes are configurable to communicate in a client server environment and in a peer to peer environment in the networked computing environment; and the server node and the plurality of client nodes comprise computational platforms.

10. The system of claim 6, the operations further comprising:
storing database entries corresponding to objects of the plurality of client nodes in the server node; and
including in the database entries references directed at those objects that are stored in the server node by the model node.

11. A computer readable storage medium having computer-readable program code embodied therewith, and wherein the computer-readable program code when executed by a processor causes operations, the operations comprising:
maintaining a server node in a networked computing environment, wherein the server node is coupled to a plurality of client nodes via a network, and wherein storage is coupled to the server node within the networked computing environment;
selecting a model node that is a first client node of the plurality of client nodes, prior to receiving a request to backup an object corresponding to a second client node of the plurality of client nodes at the server node, wherein the model node is selected according to a criterion such that objects to be backed up from the plurality of client nodes to the storage coupled to the server node are more likely to have been backed up from the model node than from any other client node of the plurality of client nodes, wherein metadata corresponding to the objects is stored in a database, and wherein the model node is updated more frequently with latest updates in comparison to other client nodes of the plurality of client nodes; and
in response to selecting the model node, storing in the storage, by the server node, data backed up by the model node in a first storage medium that is accessible faster in comparison to a second storage medium in which data backed up by client nodes that are different from the model node are stored.

12. The computer readable storage medium of claim 11,
wherein the first storage medium is a disk,
wherein the second storage medium comprises a plurality of tapes,
wherein the data backed up by the model node is stored in the disk, and
wherein the data backed by the client nodes that are different from the model node are stored in the plurality of tapes.

13. The computer readable storage medium of claim 12, wherein each tape of the plurality of tapes store backup data corresponding to different client nodes of the plurality of nodes.

14. The computer readable storage medium of claim 12, wherein:
the network comprises the Internet;
the server node and the plurality of client nodes are configurable to communicate in a client server environment and in a peer to peer environment in the networked computing environment; and
the server node and the plurality of client nodes comprise computational platforms.

15. The computer readable storage medium of claim 11, the operations further comprising:
storing database entries corresponding to objects of the plurality of client nodes in the server node; and
including in the database entries references directed at those objects that are stored in the server node by the model node.

16. A method for deploying computing infrastructure, comprising integrating computer-readable code into a computing system, wherein the computer-readable code in combination with the computing system is capable of performing:
maintaining a server node in a networked computing environment, wherein the server node is coupled to a plurality of client nodes via a network, and wherein storage is coupled to the server node within the networked computing environment;
selecting a model node that is a first client node of the plurality of client nodes, prior to receiving a request to backup an object corresponding to a second client node of the plurality of client nodes at the server node, wherein the model node is selected according to a criterion such that objects to be backed up from the plurality of client nodes to the storage coupled to the server node are more likely to have been backed up from the model node than from any other client node of the plurality of client nodes, wherein metadata corresponding to the objects is stored in a database, and wherein the model node is updated more frequently with latest updates in comparison to other client nodes of the plurality of client nodes; and
in response to selecting the model node, storing in the storage, by the server node, data backed up by the model node in a first storage medium that is accessible faster in comparison to a second storage medium in which data backed up by client nodes that are different from the model node are stored.

17. The method for deploying computing infrastructure of claim 16,
wherein the first storage medium is a disk,
wherein the second storage medium comprises a plurality of tapes,
wherein the data backed up by the model node is stored in the disk, and
wherein the data backed by the client nodes that are different from the model node are stored in the plurality of tapes.

18. The method for deploying computing infrastructure of claim 17, wherein each tape of the plurality of tapes store backup data corresponding to different client nodes of the plurality of nodes.

19. The method for deploying computing infrastructure of claim 17, wherein:
the network comprises the Internet;
the server node and the plurality of client nodes are configurable to communicate in a client server environment and in a peer to peer environment in the networked computing environment; and
the server node and the plurality of client nodes comprise computational platforms.

20. The method for deploying computing infrastructure of claim 16, wherein the computer-readable code in combination with the computing system is further capable of performing:
storing database entries corresponding to objects of the plurality of client nodes in the server node; and
including in the database entries references directed at those objects that are stored in the server node by the model node.

* * * * *